United States Patent
Olderdissen

(10) Patent No.: US 7,414,975 B2
(45) Date of Patent: Aug. 19, 2008

(54) PROTOCOL STACK

(75) Inventor: Jan Olderdissen, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 656 days.

(21) Appl. No.: 11/089,845

(22) Filed: Mar. 24, 2005

(65) Prior Publication Data

US 2006/0215695 A1 Sep. 28, 2006

(51) Int. Cl.
*H04J 3/24* (2006.01)

(52) U.S. Cl. ............ 370/236; 370/392; 370/469; 370/474; 714/746

(58) Field of Classification Search ............ None
See application file for complete search history.

(56) References Cited

U.S. PATENT DOCUMENTS

| | | | |
|---|---|---|---|
| 5,805,927 A | 9/1998 | Bowes et al. | |
| 5,974,518 A | 10/1999 | Nogradi | |
| 6,021,133 A | 2/2000 | Asghar | |
| 6,088,777 A | 7/2000 | Sorber | |
| 6,091,725 A | 7/2000 | Cheriton et al. | |
| 6,157,955 A | 12/2000 | Narad et al. | |
| 6,172,989 B1 | 1/2001 | Yanagihara et al. | |
| 6,173,333 B1 | 1/2001 | Jolitz et al. | |
| 6,401,117 B1 | 6/2002 | Narad et al. | |
| 6,408,006 B1 | 6/2002 | Wolff | |
| 6,421,730 B1 | 7/2002 | Narad et al. | |
| 6,483,840 B1 | 11/2002 | Vogel | |
| 6,625,689 B2 | 9/2003 | Narad et al. | |
| 6,675,218 B1 | 1/2004 | Mahler et al. | |
| 6,678,246 B1 | 1/2004 | Smyth | |
| 6,721,274 B2 | 4/2004 | Hale et al. | |
| 6,728,253 B1 | 4/2004 | Jeffries et al. | |
| 6,965,941 B2 * | 11/2005 | Boucher et al. | 709/230 |
| 2002/0087732 A1 * | 7/2002 | Boucher et al. | 709/250 |
| 2002/0172205 A1 | 11/2002 | Tagore-Brage et al. | |
| 2003/0076822 A1 * | 4/2003 | Shalom et al. | 370/378 |
| 2004/0010612 A1 | 1/2004 | Pandya | |
| 2004/0030757 A1 | 2/2004 | Pandya | |
| 2004/0057380 A1 * | 3/2004 | Biran et al. | 370/235 |
| 2006/0098653 A1 * | 5/2006 | Adams et al. | 370/389 |

OTHER PUBLICATIONS

Danzig, P.B. and Jamin, S., TCPLIB: A Library of TCP Internetwork Traffic Characteristics, Online!, 1991.
Zec, Marko, Network Stack Cloning/Virtualization Extensions to the Free BSD Kernel, website: http://www.tel.fer.hr/zec/vimage/, Jun. 2003-Jul. 2005.
Zec, Marko, Implementing a Clonable Network Stack in the FreeBSD Kernel, Proceedings of the 2003 USENIX Annual Technical Conference, 2003.
Zec, Marko, BSD Network Stack Virtualization, BSDCon Europe, Amsterdam, Nov. 2002.

* cited by examiner

*Primary Examiner*—Wing F. Chan
*Assistant Examiner*—Brian Roberts
(74) *Attorney, Agent, or Firm*—SoCal IP Law Group LLP; Steven C. Sereboff; Mark Andrew Goldstein

(57) ABSTRACT

There are disclosed processes and systems relating to protocol stacks. The protocol stack may be run entirely in a single memory space. There may be a communal memory region available to certain layers of the protocol stack. The layers of the protocol stack may form condensed versions of data and headers, and data units may be formed by hardware within the device when needed. After transmission, data units may be immediately deleted but recreated if needed for retransmission.

39 Claims, 4 Drawing Sheets

PROTOCOL STACK

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to protocol stacks.

2. Description of the Related Art

In a packet switched network, a message to be sent is divided into packets of fixed or variable length. The packets are then sent individually over the network through multiple switches or nodes and then reassembled at a final destination before being delivered to a target device or end user. To ensure proper transmission and re-assembly of the packets at the receiving end, various control data, such as sequence and verification information, is typically appended to each packet in the form of a packet header. At the receiving end, the packets are then reassembled and the message is passed to the end user in a format compatible with the user's equipment.

Most packet switched networks operate according to a set of established protocol layers, collectively defining a protocol stack. The protocol stack is a plurality of interfaced layers. These layers may be defined according to the Open Systems Interconnect (OSI) model, having seven layers (from top to bottom): application, presentation, session, transport, network, data-link and physical. All but the physical layer are typically software, though the network and data-link layer may be firmware and/or hardware. Each layer of the protocol stack exists to perform a specific function, such as addressing, routing, framing and physical transmission of packets. When a packet is to be transmitted over a network from a source system to a destination system, the packet will pass in a logically downward direction through layers of the protocol stack on the source system, and in a logically upward direction through corresponding layers of the protocol stack on the destination system. Each layer passes the packet to the adjacent layer, either up or down the protocol stack depending on whether the packet has been received or is being transmitted.

Each layer of the protocol stack in the transmitting process may add a respective header to the packet, which provides information to the corresponding layer in a receiving process. Thus, as a packet passes down through the protocol stack on a transmitting system, the packet may gain an additional header at each layer. At the bottom of the stack, the transmitting process may then frame the packet and physically transmit it over the network toward its destination. When the packet reaches its destination, the packet will then pass up through the protocol stack of the destination system. Each layer of the protocol stack in the destination system may obtain useful information from its associated header and will strip its header from the packet before passing the packet up to the next layer for processing. At the top of the protocol stack, the application layer typically receives a byte stream from the layer below it, not individual packets. The byte stream may consist of data that consists of a partial packet or data that covers more than one packet. This is very convenient for the application but may impair performance.

The layers at the top of a protocol stack are typically designed to provide end-to-end communication between source and destination machines on the network. For instance, the top layers may provide packet sequence information and encryption. Lower layers of the stack, on the other hand, often provide information to facilitate communication between immediately adjacent machines in the network. For instance, the lower layers in the protocol stack may provide network address information, for use in routing packets through the network.

A variety of standards are known for use in packet switched networks. One of these, the TCP/IP suite, is typically used to manage transmission of packets throughout the Internet and other IP networks. The TCP/IP protocol stack has four layers, generally corresponding to but differing somewhat from the OSI model.

The TCP/IP application layer corresponds to a combination of the application, presentation and session layers of the OSI model. The TCP/IP application layer includes application programs that carry out the functionality of a network device and interface with a user.

The TCP/IP transport layer corresponds to the transport layer of the OSI model. The TCP/IP transport layer allows source and destination machines to carry on a conversation with each other and includes a connection-oriented Transmission Control Protocol (TCP) layer, but may alternatively be a connectionless User Datagram Protocol (UDP) layer. The transport is TCP or UDP, respectively. With UDP, the application layer is aware of individual packets.

The TCP/IP network layer corresponds to the network layer of the OSI model. The TCP/IP network layer provides addressing information to facilitate independent routing of packets within or between networks and also includes other control layers, such as an Internet Control Message Protocol (ICMP) layer and an Address Resolution Protocol (ARP) layer.

The TCP/IP link layer corresponds to a combination of the data-link and physical layers of the OSI model. The TCP/IP link layer includes network interface card drivers to connect the machine to the physical network, such as an Ethernet network.

In general, the machines that implement the protocol stack in a packet switched network (including, without limitation, source machines, destination machines, packet switches and routers) are computers. Each of these computers includes one or more processors, memories, and input/output ports, and is managed by an operating system.

The computer memory may include a user space and a kernel space. The kernel space is an area of memory which is strictly reserved for running the kernel, device drivers and any kernel extensions. Though some portions of the kernel space may be swapped (paged) out to the disk, some portions are typically never swappable. The user space is a memory area used by all applications and this memory can typically be swapped out at any time depending upon the current system requirements. The user space and the kernel space are distinct. An application usually cannot access the kernel space directly, and similarly kernel code cannot access the user space without checking whether the page is present in memory or swapped out. Applications may, however, use the kernel to access system resources and hardware through system calls, and are therefore thought of as running above, or on top of, the kernel.

Typically, when an incoming packet enters a computer or other hardware device running a protocol stack, the destination of the packet may be some specific code within the kernel, or it may be an application running in the application layer. In any event, the packet will typically be processed by multiple layers of the protocol stack finally arriving at its destination. Similarly, an outgoing packet will typically be processed by multiple layers of the protocol stack before being transmitted onto the network.

In a typical network-capable computer, part of the protocol stack is implemented in kernel space and part is implemented in user space. In the TCP/IP suite, the link, network and transport layers run in kernel space, and the application layer runs in user space. While a packet is being processed in kernel space, pointers to the packet are passed amongst the layers and typically the packet is not recopied for each layer.

When data (e.g., a byte stream) passes between the application layer and the transport layer of the TCP/IP protocol stack, the data moves between user space and kernel space. Since user space and kernel space are separate areas of memory, however, the process of moving data includes copying the data to the destination area and then deleting the original. Thus, in practice, once an incoming packet reaches the top of the kernel protocol stack, its payload is copied to user space to be processed by the application layer of the stack, and the packet is then deleted from kernel space. Similarly, once an outgoing payload has been processed by the application layer in user space, it is copied to kernel space to be processed by the remainder of the protocol stack, and it is then deleted from user space.

DETAILED DESCRIPTION OF THE INVENTION

Throughout this description, the embodiments and examples shown should be considered as exemplars, rather than limitations on the apparatus and methods of the present invention.

Description of Systems

As explained above, protocol stacks are commonly used in general purpose computers and other computer devices and systems. Protocol stacks are also used in network testing systems.

Figure 1:
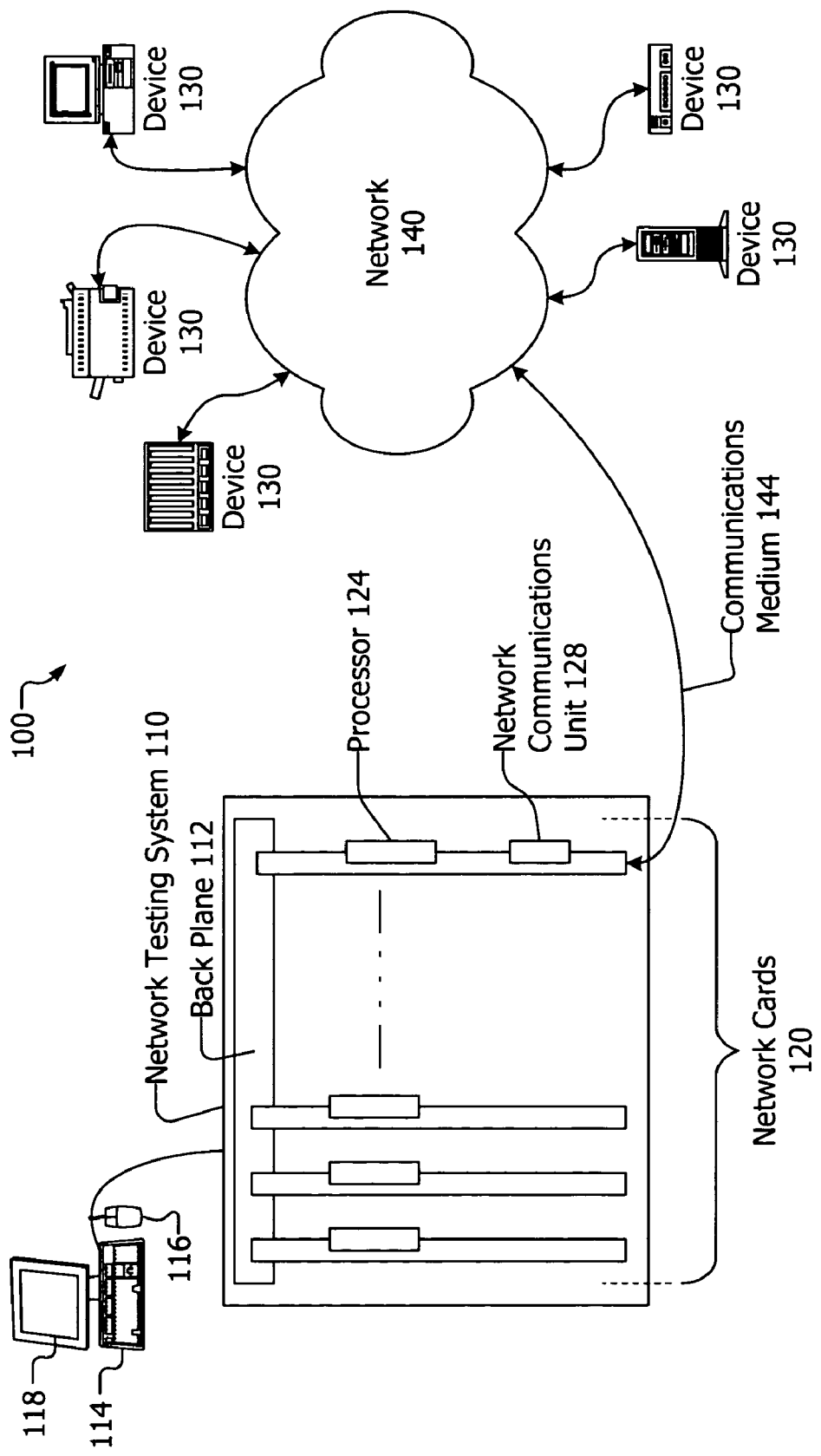
FIG. 1 is a diagram of an environment in which a protocol stack may be implemented.

Referring now to FIG. 1 there is shown a block diagram of an environment 100 in which a protocol stack may be implemented. The environment includes network testing system 110 coupled via a network card 120 to a network 140 over a communications medium 144. The network testing system 110 may include or be one or more of a performance analyzer, a conformance validation system, a network analyzer, a data unit blaster, a network management system, a combination of these, and/or others. The network testing system may be used to evaluate and/or measure characteristics and performance of a communication line or system, including the throughput of network traffic, the number of dropped data units, jitter, and many others. The network testing system may be used to evaluate the performance of servers, networking devices such as, for example, routers, gateways, load sharers, and others, as well as network applications and other software.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 120 and a back plane 112. The network cards 120 may be coupled with the back plane 112. One or more network cards 120 may be included in the network testing system 110. The network cards 120 may be permanently installed in the network testing system 110, may be removable, or may be a combination thereof.

The network testing system 110 and/or one or more of the network cards 120 may include an operating system such as, for example, versions of Linux, Unix and Microsoft Windows.

Network card 120 is coupled with network 140 via a communications medium 144. Although only one connection over communications medium 144 is shown, each of the network cards 120 may be connected with network 140 over a communications medium. The communications medium may be, for example, wire lines such as an Ethernet cable, fiber optic cable, and coaxial cable, and may be wireless.

The network testing system 110 and the network cards 120 may support one or more well known higher level communications standards or protocols such as, for example, one or more versions of the User Datagram Protocol (UDP), Transmission Control Protocol (TCP), Real-Time Transport Protocol (RTP), Internet Protocol (IP), Internet Control Message Protocol (ICMP), Internet Group Management Protocol (IGMP), Session Initiation Protocol (SIP), Hypertext Transfer Protocol (HTTP), address resolution protocol (ARP), reverse address resolution protocol (RARP), file transfer protocol (FTP), Simple Mail Transfer Protocol (SMTP); may support one or more well known lower level communications standards or protocols such as, for example, the 10 and/or 40 Gigabit Ethernet standards, the Fibre Channel standards, one or more varieties of the IEEE 802 Ethernet standards, Sonet, CDMA, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®); Bluetooth; may support proprietary protocols; and may support other protocols. Each network card 120 may support a single communications protocol, may support a number of related protocols, or may support a number or combination of unrelated protocols.

The term "network card" as used herein encompasses line cards, test cards, analysis cards, network line cards, load modules, interface cards, network interface cards, data interface cards, data unit engine cards, service cards, smart cards, switch cards, relay access cards, CPU cards, port cards, and others. The network cards 120 may be referred to as blades, particularly when a processor is included on the network card. The network cards 120 may include one or more processors 124 and one or more network communications units 128.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols in hardware. The network communications unit 128 may include a network interface through which the network card 120 may transmit and/or receive communications over the network 140.

The back plane 112 may serve as a bus or communications medium for the network cards 120. The back plane 112 may also provide power to the network cards 120.

The network testing system 110 may have a computer coupled thereto (not shown). The computer may be local to or remote from the network testing system 110. In another embodiment, the network testing system 110 may include a CPU on a card, motherboard or backplane that allows the chassis to also serve as a computer workstation. The network testing system 110 may have coupled therewith a display 118 and user input devices such as a keyboard 114 and a mouse 116, as well as other user input devices including, for example, pens and trackballs. The user input devices may be coupled to a network card, other card, motherboard, or the back plane 112.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the devices 130 in the network 140. The network testing system 110 may be used to test and evaluate the network 140 and/or portions thereof, network capable devices 130, applications running on network capable devices 130, and/or services provided by network 140 and/or network capable devices 130.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, may be data unit switched or circuit switched, and may be a combination of these. The network 140 may be comprised of a single or numerous nodes providing numerous physical and logical paths for data units to travel.

Communications on the network 140 may take various forms, including frames, cells, datagrams, data units, higher level logical groupings of data, or other units of information, all of which are referred to herein as data units. Those data units that are communicated over a network are referred to herein as network traffic. The network traffic may include data units that represent electronic mail messages, computer files, web pages, graphics, documents, audio and video files, streaming media such as music (audio) and video, telephone (voice) conversations, and others.

The network capable devices 130 may be devices capable of communicating over the network 140 and/or listening to, injecting, delaying, dropping, and/or modifying network traffic on network 140. The network capable devices 130 may be computing devices such as computer workstations, personal computers, servers, portable computers, set-top boxes, video game systems, personal video recorders, telephones, personal digital assistants (PDAs), computing tablets, and the like; peripheral devices such as printers, scanners, facsimile machines and the like; network capable storage devices including disk drives such as network attached storage (NAS) and storage area network (SAN) devices; testing equipment such as analyzing devices, network conformance systems, emulation systems, network monitoring devices, and network traffic generators; and networking devices such as routers, relays, firewalls, hubs, switches, bridges, traffic accelerators, and multiplexers. In addition, the network capable devices 130 may include appliances such as refrigerators, washing machines, and the like as well as residential or commercial heating, ventilation, and air conditioning (HVAC) systems, alarm systems, and other devices or systems capable of communicating over a network. One or more of the network capable devices 130 may be devices to be tested and may be referred to as devices under test.

The hardware and firmware components of the network testing system 110 may include various specialized units, circuits, software and interfaces for providing the functionality and features described here. The invention may be embodied in whole or in part in software which operates on a computer and take the form of firmware, an application program, an applet (e.g., a Java applet), a browser plug-in, a COM object, a dynamic linked library (DLL), a script, one or more subroutines, a device driver, or an operating system component or service. The hardware and software of the invention and its functions may be distributed.

Additional and fewer units, modules or other arrangement of software, hardware and data structures may be used to achieve the systems and devices described herein.

To communicate data units on the network 140, the network testing system 110 and other systems and devices may include a protocol stack. The network testing system 110 may have various types of applications programs, such as test applications. These test applications may be the top layer of a protocol stack. Test applications have functions such as performance analysis, conformance validation, network analysis, packet blasting, and network management.

One way to optimize performance of the protocol stack is to run the entire stack in a single memory space, and in particular in either the user space or the kernel space. Thus, while a typical application (e.g., a test application) runs only in user space, the application may be configured or adapted to run in kernel space with the rest of the protocol stack. Conversely, typical TCP/IP transport, network and link layers run only in kernel space, but the TCP/IP transport, network and link layers (or the OSI transport, network and data-link layers) may be configured or adapted to run in user space with the application.

By running the entire protocol stack in a single memory space, several benefits may be obtained. These benefits include increased speed, lower memory utilization, lower memory requirements, and reduced processing requirements.

At least some of the benefits of running the entire protocol stack in a single memory space may be achieved without actually running the entire protocol stack in a single memory space. One option is to have a communal memory space for all or substantially all of the layers of the protocol stack. Thus, the programs or code of some layers can be run in one space and other layers run in another space, but there may be a shared memory space for all or most of the layers. For example, the application programs can be run in user space and the lower layers run in kernel space, but there may be a communal memory space for at least the application, transport and network layers which provides communal access to certain buffers, such as a buffer for data units. Thus, the benefit is achieved because data units do not have to be copied and deleted as they are passed between layers, and instead pointers can be passed which point into the communal buffer.

Figure 2:
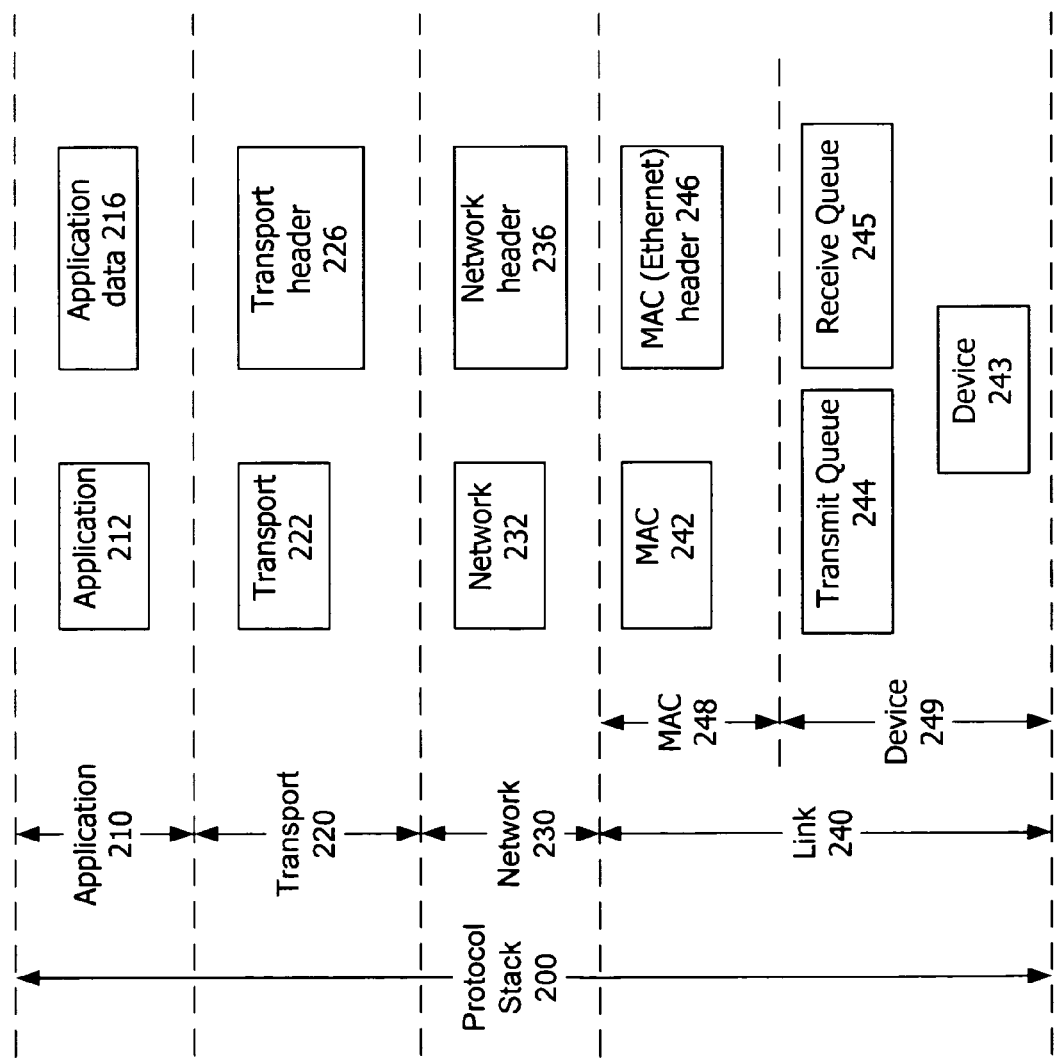
FIG. 2 is a block diagram of a TCP/IP protocol stack.

Referring now to FIG. 2 there is shown a diagram of a TCP/IP protocol stack 200. The protocol stack 200 has the four layers described above: application 210, transport 220, network 230 and link 240. In FIG. 2, the layers 210, 220, 230, 240 are demarcated by dashed lines. The protocol stack 200 runs entirely in a kernel space as a communal memory space. For each layer 210, 220, 230, 240 there may be a corresponding processing unit (software and/or hardware), memory constructs and data constructs. The TCP/IP protocol stack 200 has both transmit and receive capabilities, though this is not required of all protocol stacks.

Within the application layer 210, there is an application 212 and application data 216. It may be noted that the application layer 210 lacks a write buffer as is typical in the prior art. Because the application layer 210 accesses the same memory space as the other layers, a write buffer is not needed. The application data 216 is the payload of a data unit.

Within the transport layer 220, there is a transport unit 222, and a transport header 226. The transport unit 222 forms transport headers for transmission and interprets received transport headers. In TCP and UDP, the transport header includes a checksum.

Within the network layer 230, there is a network unit 232 and a network header 236. In a TCP/IP protocol stack, the network protocol is IP. The network unit 232 forms network headers. In IP, the network header 236 includes a checksum.

The device layer 240 may be viewed as having a MAC layer 248 and a device layer 249 as separate layers or sublayers. Within the link layer 240, there is a media access control (MAC) unit 242, a device 243, a transmit queue 244, a receive queue 245 and a MAC header 246. The MAC unit 242 forms MAC headers for transmission and interprets received MAC headers. The MAC header may be an Ethernet header. The device 243 frames and transmits data units, and receives and de-frames data units. The transmit queue 244 may store references to data units to be transmitted and priorities for processing by the device 243. The receive queue 245 may store references to received data units and priorities for processing by the device 243. The device 243 may be or have hardware for assembling data units.

Figure 3:
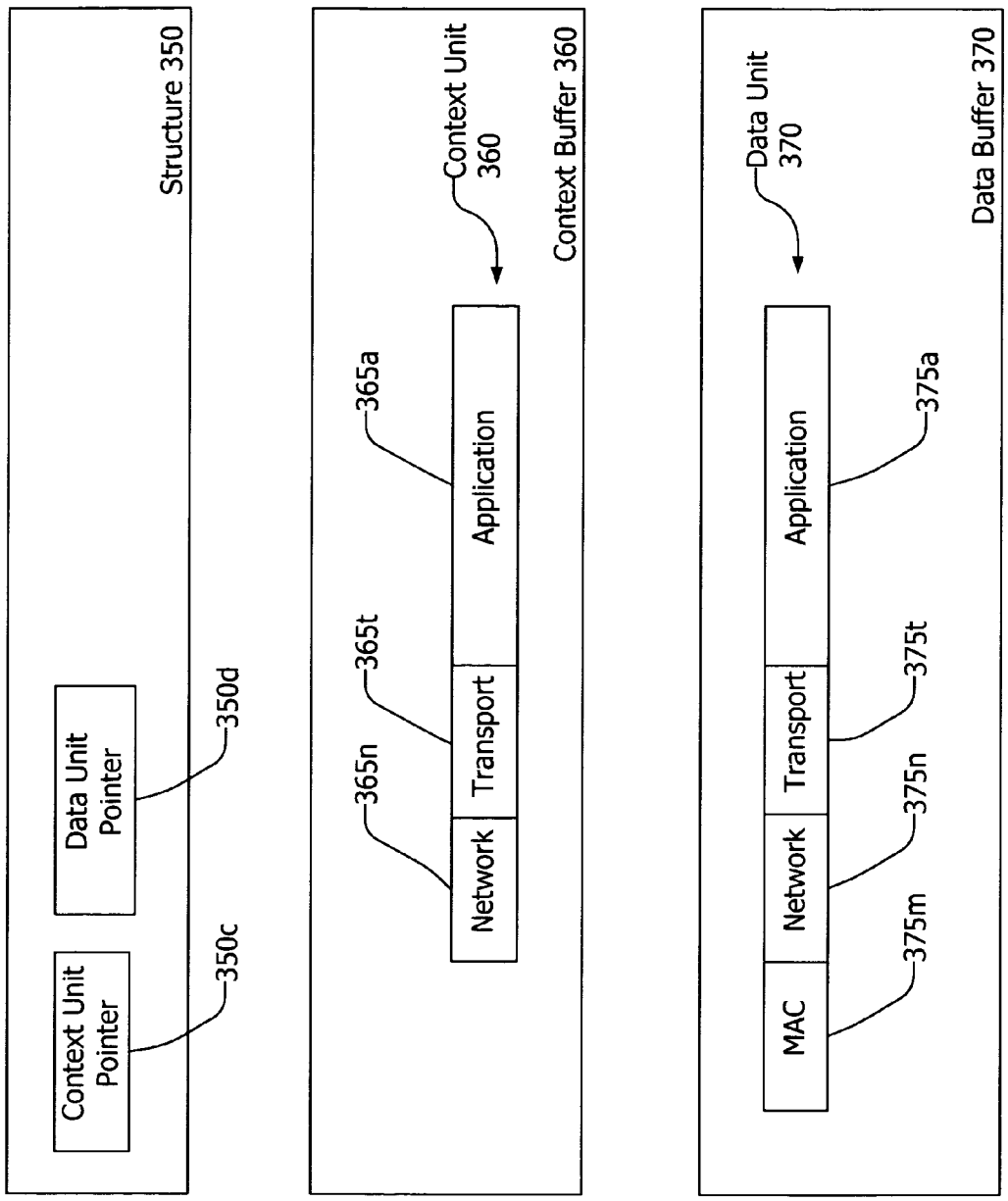
FIG. 3 is a block diagram of a communal memory space.

Referring now to FIG. 3 there is shown a block diagram of a communal memory space 300. The communal memory space 300 may include a structure 350, a context buffer 360 and a data buffer 370. The structure 350, the context buffer 360 and the data buffer 370 may be created on the fly. In transmit mode, the protocol stack 200 (FIG. 2) forms context units in the context buffer 360 and data units in the data buffer 370. In receive mode, the protocol stack stores data units in the data buffer 370, and the context buffer 360 is not needed. The protocol stack may use the structure 350 for accessing, managing and operating on the context units and the data units.

The data unit buffer 370 may store one or more data units 375. The data unit 375 may have a MAC portion 375m, a network portion 375n, a transport portion 375t and an application portion 375a. These portions 375a, 375t, 375n, 375m may have length of zero or more bits.

The context buffer 360 may store one or more context units 365. The context unit 365 may have a network portion 365n, a transport portion 365t and an application portion 365a. These portions 365a, 365t, 365n may have length of zero or more bits. The portions 365a, 365t, 365n hold the data and/or headers in the corresponding data unit portions, and may be in a condensed or otherwise modified form. The condensed form may be an encoded or simplified version. For example, network testing applications will usually send mostly the same data. This data may be, for example, a million zeros, a common header, etc. An application can control the application portion of the context unit 365 and/or data unit 375.

The portions of the context unit 365 and data unit 375 hold data and/or headers from the corresponding layers of the protocol stack. The data unit portions and context unit portions may be in different order than that shown, and may be appended, prepended or inserted into the respective data units and context units. Furthermore, different portions may be added to a context unit or a data unit at different times.

The context unit 365 may be a condensed version of the data unit 375. The context unit 365 may describe the corresponding data in the data unit 375 as a sequence of descriptors. By storing the context unit 365, storing the data unit 375 in an application write buffer is not required. Some of the portions 365a, 365t, 365n of the context unit 365 may include or be checksums, which may be calculated in conjunction with the formation of the portions 365a, 365t, 365n.

There may be a number of types of descriptors used in the data unit 375 and/or the context unit 365. The descriptors can include raw data, constant data, null data and random data. For raw data, the descriptor points to a physical buffer that contains session specific data. For constant data, the descriptor points to a physical buffer that contains constant data. For null data, the descriptor describes a segment containing zeros. For random data, the descriptor describes a segment containing random data. For the constant data and/or null data, the descriptor may include a pre-calculated checksum or partial checksum.

The structure 350 may be a C struct or other object. The structure 350 includes a context unit pointer 350c and a data unit pointer 350d. The context unit pointer 350c points to a context unit in the context buffer 360. The data unit pointer 350d points to a data unit in the data buffer 360. The structure 350 may include pointers to one or more of the portions of the context unit 365 and data unit 375.

The structure 350 may take other forms. For example, the structure 350 may include the context buffer 360, the context unit 365, the data buffer 370 and/or the data unit 375. How and when the data unit 375 is formed may be designated or controlled through the structure 350. Thus, the layers 210, 220, 230, 240 of the protocol stack 200 may send the application data 216 and headers 226, 236, 246 to the structure 350, and the structure 350 causes a condensed form of them to be stored in the context unit 365. One reason for storing a condensed version of the data is to conserve memory in the transmit queue 244. The structure 350 may make it appear to the layers 210, 220, 230, 240 that the application data 216 and headers 226, 236, 246 have been stored in a data unit even if this is not really the case.

Description of Methods

Figure 4:
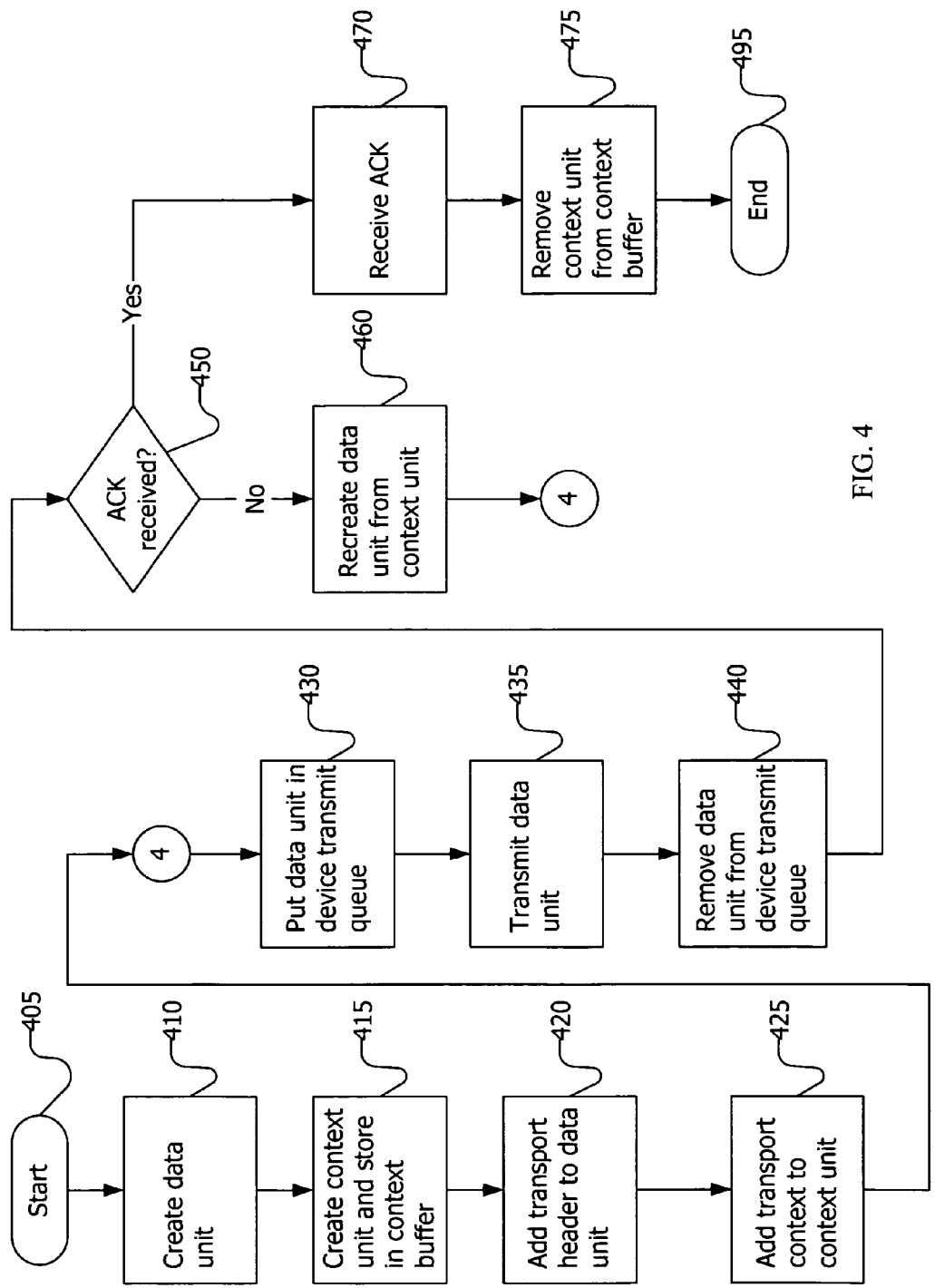
FIG. 4 is a flow chart of a process of operating a protocol stack in a device to transmit data.

Referring now to FIG. 4 there is shown a flow chart of a process of operating a protocol stack to transmit data. FIG. 4 is described with respect to the protocol stack 200 of FIG. 2 but is compatible with other protocol stacks.

The flow chart has both a start 405 and an end 495, but the process is cyclical in nature. That is, when the application 212 has data to transmit, the process will continue until all of the data is transmitted (or the process is terminated prematurely).

As part of the process, the application 212 may form, identify or allocate at least a first portion of the data for use as application data (payload) in a data unit (block 410). In conjunction with this, the application 212 or another unit may allocate (or retrieve from cache) a structure, such as the structure 350, for the data unit.

The structure 350 may come with pre-allocations for the context buffer 360 and the data buffer 370. The application 212 will be able to know the maximum size needed for the context buffer 360 and the data buffer 370. Accordingly, only two allocations are needed—for the context buffer 360 and the data buffer 370.

As a precondition, the application 212 or another unit may check to see if the transmit queue 244 has sufficient space for processing another data unit. If the desired space is available, processing will proceed. If the desired space is unavailable, the application 212 may pause to allow space to open in the transmit queue 244.

As another part of the process, the application 212 may form or begin to form the context unit 365 and store it in the context buffer 360 (block 415).

In another step, the transport unit 222 sends the transport header 226 to the structure 350 (block 420). The transport layer 220 may retain the reference for retransmission purposes. The transport layer 220 may receive the reference or some other object from the application layer 210 to indicate that the application layer 210 has completed its processing and that the transport layer 220 can begin its processing with respect to the data unit 375. The transport layer 220 may pass the reference or some other object to the network layer 230 to indicate that the transport layer 220 has completed its processing and that the network layer 230 can begin its processing with respect to the data unit 375.

In another step, the network unit 232 sends the network header 226 to the data structure 350 (block 425). The network layer 230 may pass the reference or some other object to the link layer 240 to indicate that the network layer 230 has completed its processing and that the link layer 240 can begin its processing with respect to the data unit 375.

In another step, the MAC unit 242 sends the MAC header 246 to the structure 350 (block 430). The MAC header 246 may be added to the data unit 375 just prior to transmission, so it may be unnecessary to add the MAC header 246 to the context unit 365. The MAC layer 248 may pass the reference or some other object to the device layer 249 to indicate that the MAC layer 248 has completed its processing and that the device layer 249 can begin its processing with respect to the data unit 375.

In another step, the device 243 places the reference to the data unit 375 in the transmit queue 244 (block 435). The device 243 then retrieves the data unit 375 from the data buffer 370 and transmits the data unit 375 (block 440).

After the data unit 375 has been transmitted (block 440), the device 243 may remove the reference to the data unit 375 from the transmit queue 244. At this point, the transport layer 220 or another functional unit may remove the data unit 375 from the data buffer 370. The data unit 375 may be removed from the data buffer 360 by marking the storage location of the data unit 375 in the data buffer 370 as available. This technique may be used for removing other data, including the context unit 365, from other storage locations.

The transmitting system may then check for an acknowledgement that the data unit 375 has been received by the receiving system (block 450). In TCP/IP, an acknowledgement takes the form of an ACK message from the receiving system. If the acknowledgement has been received (block 470), then the context unit 365 may be removed from the context buffer 360 (block 475).

If not, such as in a time out or NAK, then the context unit 365 may be used to recreate the data unit 375 (block 460) and the recreated data unit 375 may be passed to the link layer 240 for final formation and retransmission. In retransmission, the data unit may be given to the transport layer 220 to recreate the transport header 226. The data unit then traverses the remainder of the protocol stack 200 layer by layer. Each layer recreates the original data unit from the corresponding portion of the context unit 365 (if necessary) and session information. The recreated data unit is then transmitted and the data buffer 370 freed as with an original transmission. Note that some layers may choose to change the recreated data unit's contents from the original data unit on retransmission. For example, some interpretations of the TCP RFC allow TCP to change sequence numbers for retransmitted packets.

Turning again to the first transmission of a data unit, the data unit may be formed in different ways. In one design, the application 212 directly forms the application portion 375a of the data unit 375. In this first design, the data unit 375 may be formed prior to or concurrently with the context unit 365. Each subsequent layer may then add its respective header to the data unit 375, such as when the header is added to the corresponding context unit 365.

In another design, the data unit 375 is formed from the context unit 365. Since the context unit 365 is a condensed version of the data unit 375, the data unit 375 may be created (or recreated) from the context unit 365. In this second design, the data unit 375 may be formed from the context unit 365 at different times, such as directly after the context unit 365 is formed, or later when the data unit 375 is needed. For example, the device 234 may use the context unit 365 to form the data unit 375. In this second design, allocation of the data buffer 370 or the space for the data unit 375 may be deferred, such as when the data unit 375 is needed.

In the second design, the application unit 212 need not check whether the transmit queue 244 is able to receive data units. Instead, when the device layer 240 receives the reference to the data unit, and then there is room in the transmit queue 244 for the data unit 375, the link layer 240 (e.g., the device 243) asks the various layers to create the data unit 375. This may work like a retransmit.

In addition to originating in the application layer 210, data units may originate in the transport layer 220 or link (e.g., MAC) layer 240. For example, in TCP, SYN, SYN/ACK, ACK, RST, FIN and FIN/ACK packets without data usually originate in the TCP layer. ARP packets always originate and terminate in the MAC/IP layer. The processes described herein for sending and receiving data units apply, with the difference that the application layer 210 does not initiate or receive them.

With regard to FIG. 4, additional and fewer steps may be taken, and the steps as shown may be combined or further refined to achieve the methods described herein.

Received data units traverse the protocol stack 200 from bottom to top—largely the reverse of the transmit process. However, since data units are not formed and there is no concern about retransmission, the context buffer and context units are not relevant. In the receive process, data units are processed from the link layer 240 all the way through the application layer 210 without making extra copies and long-term buffering of data units. Instead, each layer processes and removes (by way of changing a pointer or index) its respective data or headers from the data unit. The receive process may also utilize the structure 350.

Depending on the implementation, it may be beneficial to cleverly manage priorities when dealing with large numbers of connections. The following rules may be relevant:

1. Provide the receive queue with a high and a low water mark. Production of packets in the protocol stack should cease when the receive queue hits the high water mark. Production of packets can resume when the receive queue hits the low water mark.

2. The protocol stack may not produce packets if the transmit queue is full or if rule 1 prevents production.

3. When production ceases, stack elements that would like to produce a packet log a notification to self on an event queue. When production unblocks, the stack elements receive events from the event queue.

4. Packets on the receive queue are processed with priority.

5. To avoid oscillation (between receiving and sending) it may be necessary to soften rule 4.

Although exemplary embodiments of the present invention have been shown and described, it will be apparent to those having ordinary skill in the art that a number of changes, It is claimed:

1. A process of operating a protocol stack to transmit data, the protocol stack comprising a plurality of interfaced layers including an application layer, a transport layer and a device layer, the device layer having a transmit queue, the process comprising
   (a) forming at least a first portion of the data into a data unit
   (b) forming a context unit
   (c) the transport layer creating a transport header for the data unit
   (d) adding a transport context of transport information to the context unit
   (f) transmitting the data unit from the device in an open session
   (g) removing the data unit from the transmit queue
   (h) receiving an acknowledgement that the data unit has been received
   (i) removing the context unit from the context buffer
   (j) if the acknowledgement is not received, then using the context unit to recreate the data unit and placing the recreated data unit in the transmit queue.

2. The process of operating a protocol stack to transmit data of claim 1 wherein
   step (a) includes storing the data unit in a data buffer
   step (g) includes removing the data unit from the data buffer.

3. The process of operating a protocol stack to transmit data of claim 2 wherein removing the data unit from the data buffer comprises marking a storage location of the data unit as available.

4. The process of operating a protocol stack to transmit data of claim 1 wherein step (a) comprises using the context unit to form the data unit.

5. The process of operating a protocol stack to transmit data of claim 1 comprising representing the data unit as one or more descriptors.

6. The process of operating a protocol stack to transmit data of claim 5 wherein the descriptors are selected from the group comprising raw data, constant data, null data and random data, wherein
   for raw data the descriptor points to a physical buffer that contains session specific data
   for constant data the descriptor points to a physical buffer that contains constant data
   for null data the descriptor describes a segment containing zeros
   for random data the descriptor describes a segment containing random data.

7. The process of operating a protocol stack to transmit data of claim 6 wherein for at least one of constant data and null data, the descriptor includes a pre-calculated checksum.

8. The process of operating a protocol stack to transmit data of claim 1 including
   calculating a checksum
   adding the checksum to the context unit.

9. The process of operating a protocol stack to transmit data of claim 1 wherein the forming steps are performed concurrently.

10. The process of operating a protocol stack to transmit data of claim 1 wherein the device comprises a memory having a user space and a kernel space, and steps (a), (b), (c), (d) and (e), (h), (i) and (j) are performed entirely in a single memory space selected from the group comprising the user space and the kernel space.

11. The process of operating a protocol stack to transmit data of claim 1 wherein the transport layer uses a transport selected from the group comprising TCP and UDP.

12. The process of operating a protocol stack to transmit data of claim 1 wherein the context unit comprises a condensed version of the data unit.

13. The process of operating a protocol stack to transmit data of claim 1 wherein step (c) includes steps (a) and (b).

14. A storage medium having instructions stored thereon which when executed by a processor cause the processor to perform actions, the instructions comprising a protocol stack comprising a plurality of interfaced layers including an application layer, a transport layer and a device layer, the device layer having a transmit queue, the actions comprising:
   (a) forming at least a first portion of data into a data unit
   (b) forming a context unit and storing the context unit in a context buffer
   (c) the transport layer forming a transport header for the data unit
   (d) adding a transport context of transport information to the context unit
   (e) placing the data unit in the transmit queue
   (f) transmitting the data unit from the device in an open session
   (g) removing the data unit from the transmit queue
   (h) receiving an acknowledgement that the data unit has been received
   (i) removing the context unit from the context buffer
   (j) if the acknowledgement is not received, then using the context unit to recreate the data unit and placing the recreated data unit in the transmit queue.

15. The storage medium of claim 14 wherein
   step (a) includes storing the data unit in a data buffer
   step (g) includes removing the data unit from the data buffer.

16. The storage medium of claim 15 wherein removing the data unit from the data buffer comprises marking a storage location of the data unit as available.

17. The storage medium of claim 14 wherein step (a) comprises using the context unit to form the data unit.

18. The storage medium of claim 14 comprising representing the data unit as one or more descriptors.

19. The storage medium of claim 18 wherein the descriptors are selected from the group comprising raw data, constant data, null data and random data, wherein
   for raw data the descriptor points to a physical buffer that contains session specific data
   for constant data the descriptor points to a physical buffer that contains constant data
   for null data the descriptor describes a segment containing zeros
   for random data the descriptor describes a segment containing random data.

20. The storage medium of claim 19 wherein for at least one of constant data and null data, the descriptor includes a pre-calculated checksum.

21. The storage medium of claim 14 including
   calculating a checksum
   adding the checksum to the context unit.

22. The storage medium of claim 14 wherein the forming steps are performed concurrently.

23. The storage medium of claim 14 wherein the device comprises a memory having a user space and a kernel space, and steps (a), (b), (c), (d) and (e), (h), (i) and (j) are performed entirely in a single memory space selected from the group comprising the user space and the kernel space.

24. The storage medium of claim 14 wherein the transport layer uses a transport selected from the group comprising TCP and UDP.

25. The storage medium of claim 14 wherein the context unit comprises a condensed version of the data unit.

26. The storage medium of claim 14 wherein step (c) includes steps (a) and (b).

27. A computing device to transmit data, the computing device comprising:
a processor
a protocol stack comprising a plurality of interfaced layers including an application layer, a transport layer and a device layer, the device layer having a transmit queue
a memory coupled with the processor
wherein the processor and the memory comprise circuits and software for
(a) forming at least a first portion of the data into a data unit
(b) forming a context unit and storing the context unit in a context buffer
(c) the transport layer forming a transport header for the data unit
(d) adding a transport context of transport information to the context unit
(e) placing the data unit in the transmit queue
(f) transmitting the data unit from the device in an open session
(g) removing the data unit from the transmit queue
(h) receiving an acknowledgement that the data unit has been received
(i) removing the context unit from the context buffer
(j) if the acknowledgement is not received, then using the context unit to recreate the data unit and placing the recreated data unit in the transmit queue.

28. The computing device of claim 27 wherein
step (a) includes storing the data unit in a data buffer
step (g) includes removing the data unit from the data buffer.

29. The computing device of claim 28 wherein removing the data unit from the data buffer comprises marking a storage location of the data unit as available.

30. The computing device of claim 27 wherein step (a) comprises using the context unit to form the data unit.

31. The computing device of claim 27 comprising representing the data unit as one or more descriptors.

32. The computing device of claim 31 wherein the descriptors are selected from the group comprising raw data, constant data, null data and random data, wherein
for raw data the descriptor points to a physical buffer that contains session specific data
for constant data the descriptor points to a physical buffer that contains constant data
for null data the descriptor describes a segment containing zeros
for random data the descriptor describes a segment containing random data.

33. The computing device of claim 32 wherein for at least one of constant data and null data, the descriptor includes a pre-calculated checksum.

34. The computing device of claim 27 including
calculating a checksum
adding the checksum to the context unit.

35. The computing device of claim 27 wherein the forming steps are performed concurrently.

36. The computing device of claim 27 wherein the device comprises a memory having a user space and a kernel space, and steps (a), (b), (c), (d) and (e), (h), (i) and (j) are performed entirely in a single memory space selected from the group comprising the user space and the kernel space.

37. The computing device of claim 27 wherein the transport layer uses a transport selected from the group comprising TCP and UDP.

38. The computing device of claim 27 wherein the context unit comprises a condensed version of the data unit.

39. The computing device of claim 27 wherein step (c) includes steps (a) and (b).

* * * * *